(12) United States Patent
Walker et al.

(10) Patent No.: US 8,393,347 B2
(45) Date of Patent: *Mar. 12, 2013

(54) PRESSURE RELIEF DEVICE HAVING SUPPORT MEMBER WITH RECESSED AREAS

(75) Inventors: Joseph A. Walker, Kansas City, MO (US); Bradford T. Stilwell, Blue Springs, MO (US); Bon F. Shaw, Blue Springs, MO (US); E. Dean Miller, Lees Summit, MO (US)

(73) Assignee: Fike Corporation, Blue Springs, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,687

(22) Filed: Apr. 24, 2012

(65) Prior Publication Data

US 2012/0204969 A1 Aug. 16, 2012

Related U.S. Application Data

(62) Division of application No. 12/422,851, filed on Apr. 13, 2009, now Pat. No. 8,181,663.

(51) Int. Cl.
*F16K 17/14* (2006.01)

(52) U.S. Cl. .................. 137/68.26; 220/89.3
(58) Field of Classification Search ............ 137/68.19, 137/68.21, 68.23–68.29; 220/89.2–89.3
See application file for complete search history.

(56) References Cited

U.S. PATENT DOCUMENTS

| | | | | |
|---|---|---|---|---|
| 3,704,807 A | * | 12/1972 | Lidgard | 220/89.2 |
| 4,505,180 A | * | 3/1985 | Hinrichs | 89/8 |
| 4,905,722 A | * | 3/1990 | Rooker et al. | 137/68.27 |
| 5,082,133 A | * | 1/1992 | Farwell et al. | 220/89.2 |
| 5,160,070 A | * | 11/1992 | Hibler et al. | 60/250 |
| 5,499,649 A | * | 3/1996 | Tomasko et al. | 137/68.27 |
| 6,318,576 B1 | * | 11/2001 | Graham et al. | 220/89.2 |
| 6,945,420 B2 | * | 9/2005 | Krebill et al. | 220/89.2 |
| 8,181,663 B2 | * | 5/2012 | Walker et al. | 137/68.26 |

* cited by examiner

*Primary Examiner* — John Fox
*Assistant Examiner* — David Colon Morales
(74) *Attorney, Agent, or Firm* — Hovey Williams LLP

(57) ABSTRACT

An apertured rupture disc support member (32, 90) is provided for use in a rupture disc assembly (70). A rupture disc (30, 30a) comprising one or more embossed segments (80) that are complemental with the support member apertures (56) is also disclosed. The pressure relief assembly (12) is particularly suited for use in sanitary pressure relief applications.

18 Claims, 8 Drawing Sheets

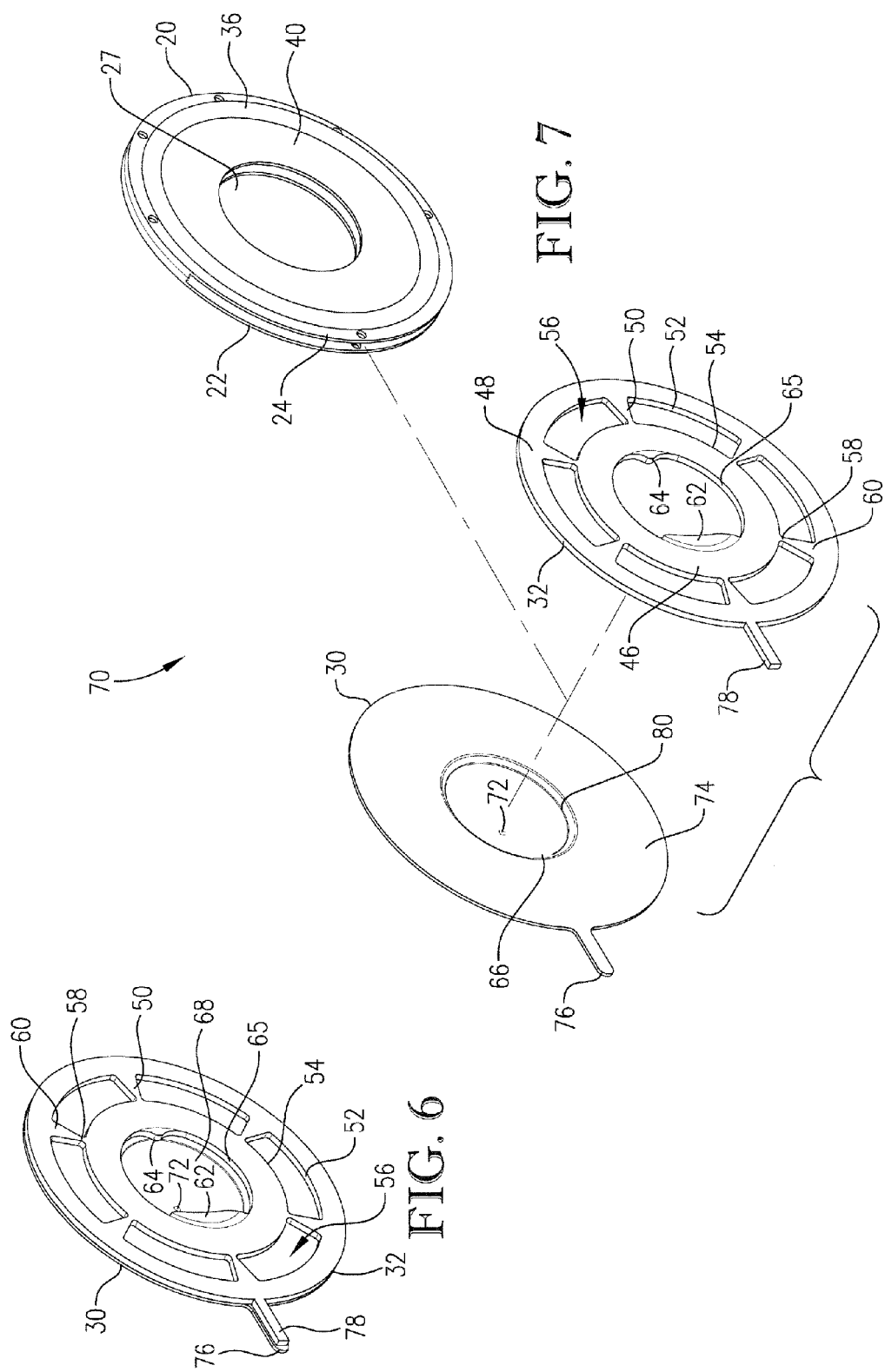

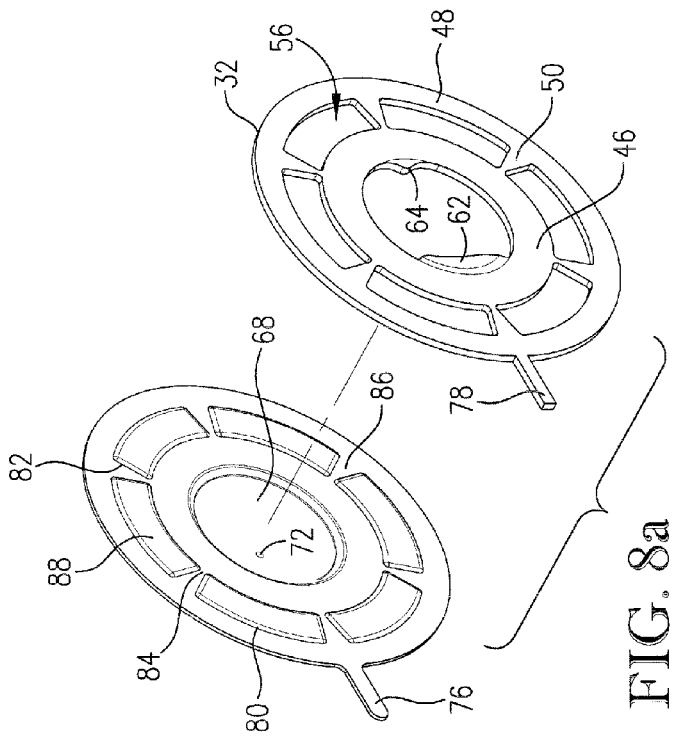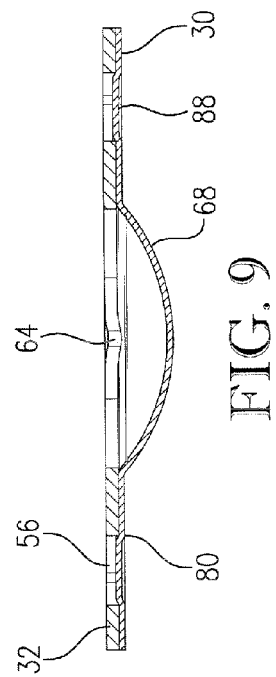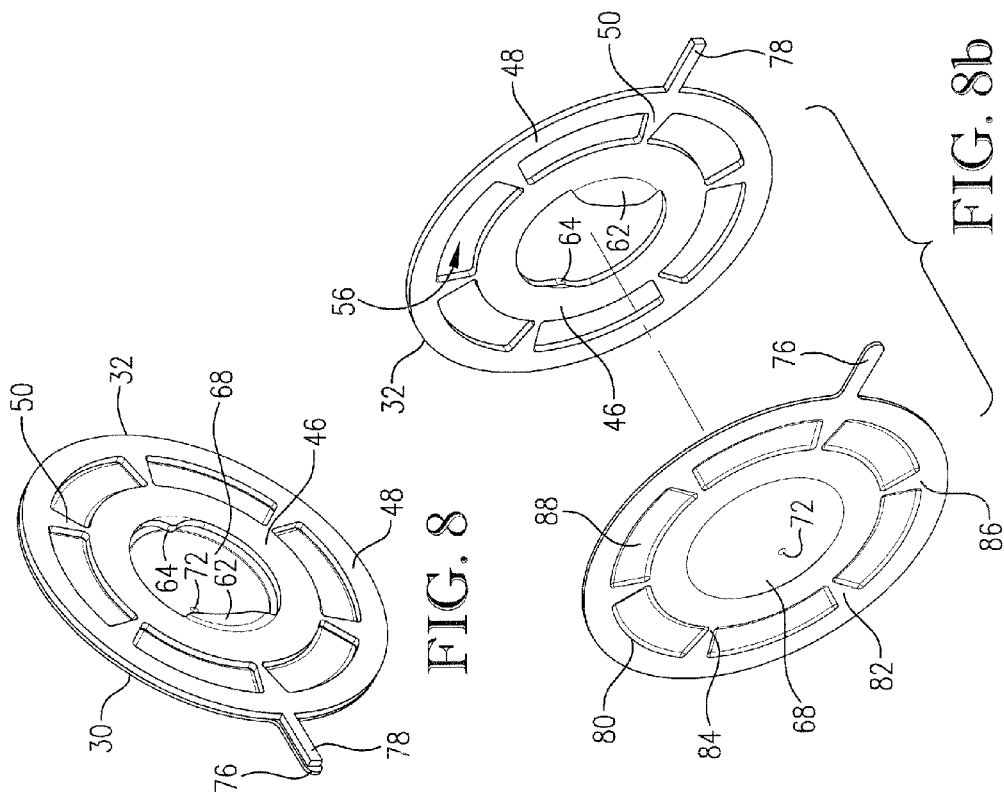

PRESSURE RELIEF DEVICE HAVING SUPPORT MEMBER WITH RECESSED AREAS

RELATED APPLICATION

This application is a divisional of U.S. patent application Ser. No. 12/422,851, filed Apr. 13, 2009, which is incorporated by reference herein.

BACKGROUND OF THE INVENTION

Field of the Invention

The present invention is generally directed toward pressure relief apparatus, and particularly over-pressure relief apparatus for use in sanitary applications, comprising a rupture disc, disc support member, and a pliable sealing gasket. The disc support member includes one or more relief areas, that may comprise, for example, apertures or pockets, surrounding the primary central opening that are capable of accommodating at least a portion of the gasket material as it is displaced during installation within the pressure relief apparatus. By this accommodation, the sealing characteristics of the disc are improved and ease of installation is maintained while gasket material is prevented from encroaching upon the rupturable portion of the rupture disc and altering its burst characteristics.

Description of the Prior Art

U.S. Pat. No. 4,759,460 is directed toward an exemplary rupture disc system comprising a reverse-buckling rupture disc and a support ring configured to prevent fragmentation of the disc upon reversal and opening of the disc. As shown in FIG. 6, the support ring is essentially a continuous ring including only a central opening for permitting fluid passage upon opening of the disc.

U.S. Pat. No. 6,318,576 is directed toward a sanitary rupture disc apparatus having a relatively large central rupturable portion relative to the entire disc diameter. The apparatus further comprises a gasket disposed around the outer periphery of the disc to provide a seal upon installation of the disc between adjacent housing sections.

U.S. Pat. No. 6,945,420 is also directed toward a sanitary rupture disc assembly comprising a reverse-acting rupture disc and an annular body. The sanitary rupture disc includes a discrete segment on the bulged section thereof that has been work hardened. Upon exposure to an over-pressure condition, reversal of the bulged section commences at the work-hardened segment.

SUMMARY OF THE INVENTION

In one embodiment according to the present invention there is provided a pressure relief device comprising a rupture disc and a rupture disc support member. The rupture disc includes a rupturable portion and a circumscribing flange section. The rupture disc support member comprises an annular inner hub, an outer peripheral portion radially spaced from the inner hub, and one or more connector segments extending between the inner hub and the outer peripheral portion. The connector segments define one or more relief areas located between the inner hub and the outer peripheral portion.

In another embodiment according to the present invention there is provided a rupture disc support member for use with a rupture disc having a peripheral flange section and a rupturable central section. The support member and the rupture disc are insertable between adjacent plies of an elastomeric or thermoplastic annular gasket prior to installation in a pressure relief device holder. The support member comprises an annular inner hub, an outer peripheral portion radially spaced from the inner hub, and one or more connector segments extending between the inner hub and the outer peripheral portion. The connector segments define one or more relief areas located between the inner hub and the outer peripheral portion for receiving respective portions of the gasket upon installation in the relief device holder.

In yet another embodiment according to the present invention there is provided a rupture disc comprising a central rupturable portion and a circumscribing flange section. The flange section has one or more embossed segments substantially uniformly distributed thereon.

BRIEF DESCRIPTION OF THE DRAWINGS

FIG. 6 is a perspective view of a rupture disc and support member assembly;

FIG. 7 is an alternate expanded view of the pressure relief device shown in FIG. 5;

FIG. 8 is a perspective view of an alternate embodiment of a rupture disc and support member assembly in accordance with the present invention;

FIG. 8*a* is an expanded view of the assembly shown in FIG. 8;

FIG. 8*b* is an alternate expanded view of the assembly shown in FIG. 8;

FIG. 9 is a cross-sectional view of the assembly shown in FIG. 8;

DETAILED DESCRIPTION OF THE PREFERRED EMBODIMENTS

Figure 2:
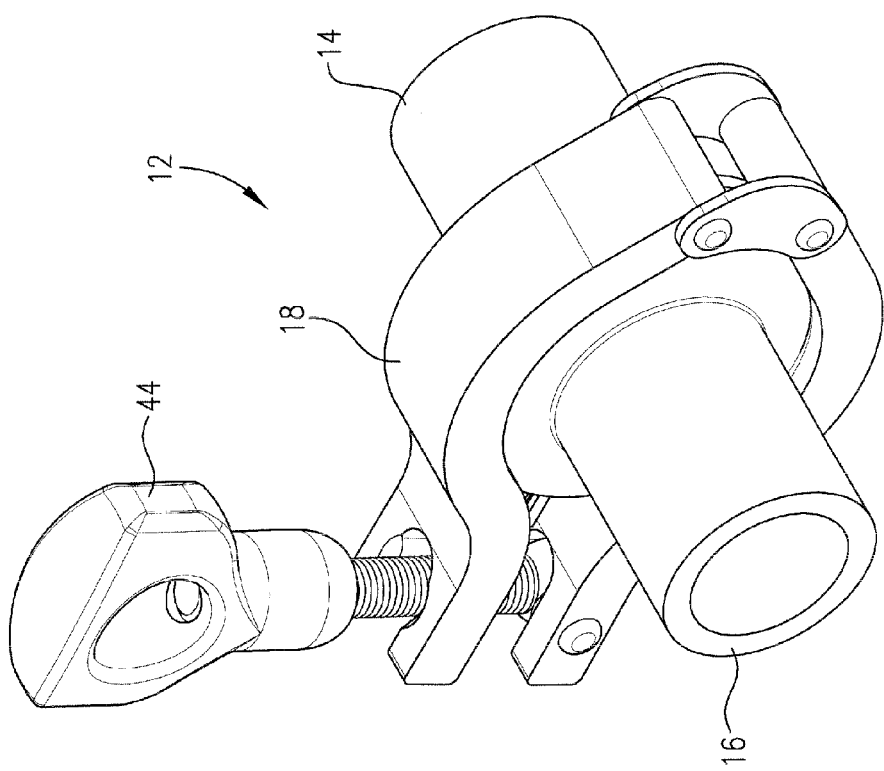
FIG. 2 is another perspective view of the pressure relief assembly shown in FIG. 1 with the clamping mechanism released.
Figure 1:
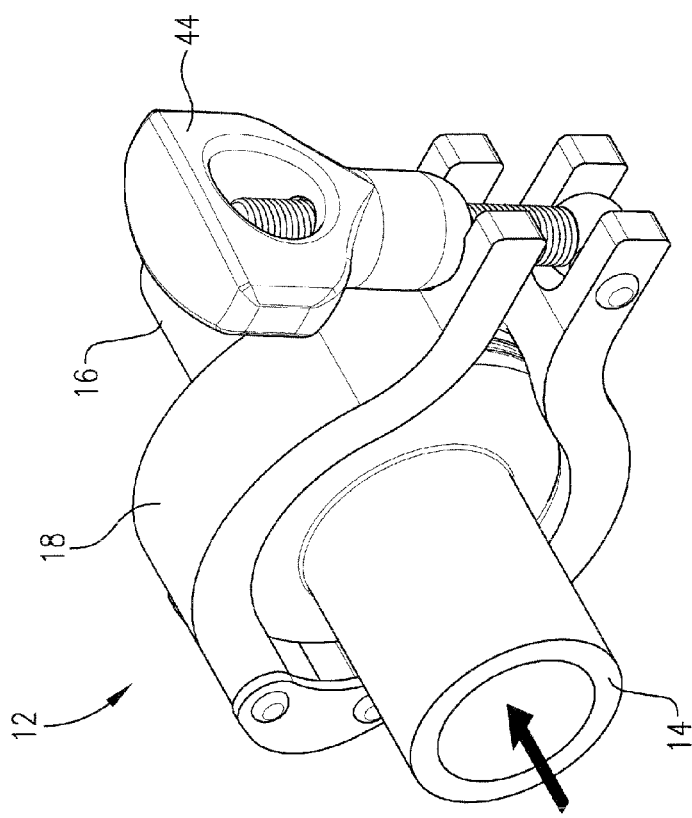
FIG. 1 is a perspective view of a pressure relief assembly according to one embodiment of the present invention.

One embodiment of the present invention is directed toward a pressure relief assembly 12 such as that shown in FIG. 1. The depicted assembly is primarily suited for use with relatively small-diameter rupture discs, especially discs having central rupturable portion diameters of 1.5 inches or smaller. In one specific embodiment, the pressure relief assembly 12 may be sized to accommodate either a 1", 1½", or DN40 standard sanitary ferrule, which in turn are sized to match standard tubing of those nominal sizes. As the ferrule OD remains the same for all three sizes, while the ID varies according to the nominal diameter, the relative sizes of rupturable portion and annular flange section vary. For example, a disc of this type having a nominal size of 1 inch will have a much smaller rupturable portion and a much greater flange section radial width than a disc of 1½" nominal size.

Figure 3:
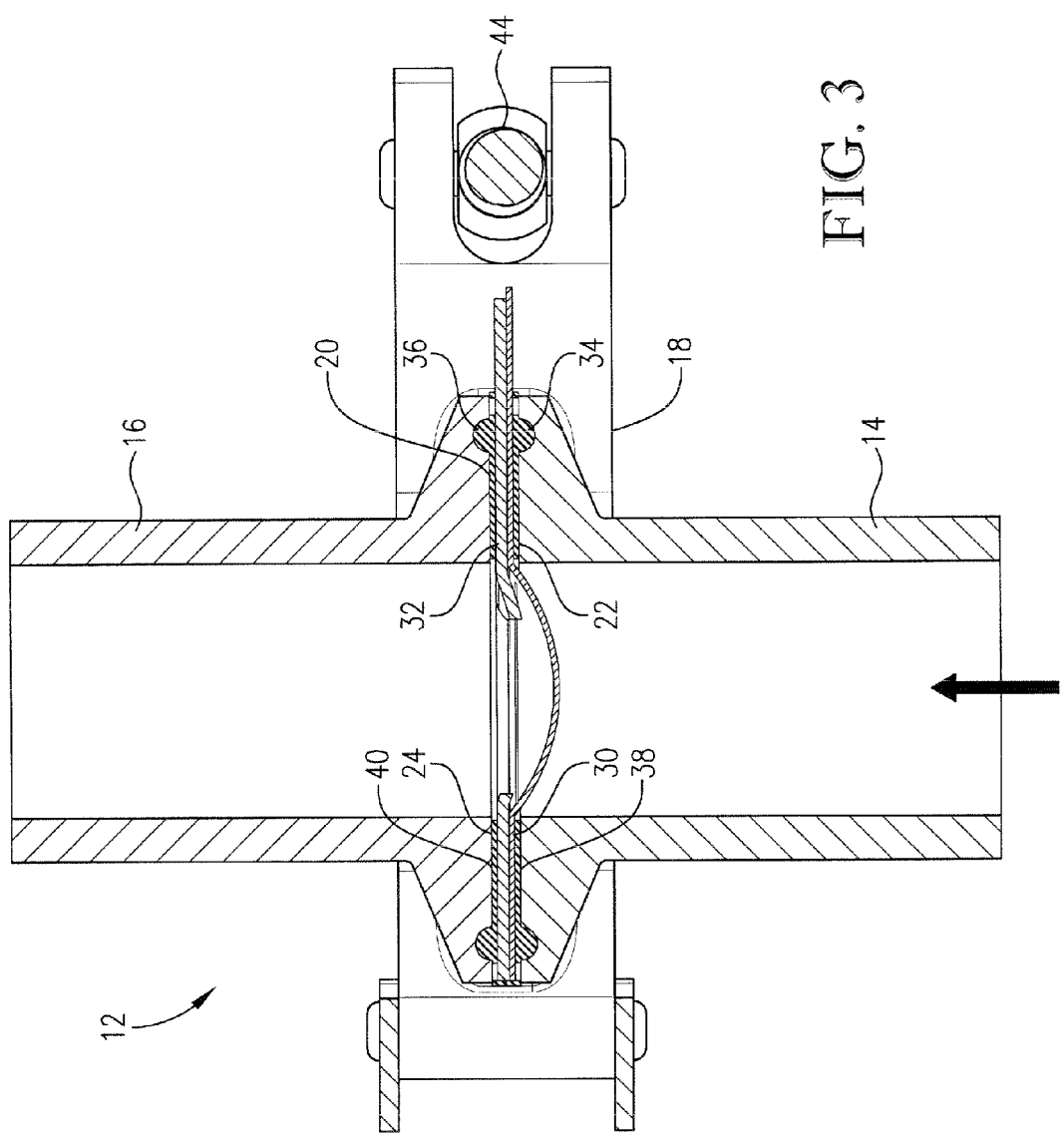
FIG. 3 is a cross-sectional view of the pressure relief assembly shown in FIG. 1.
Figure 4:
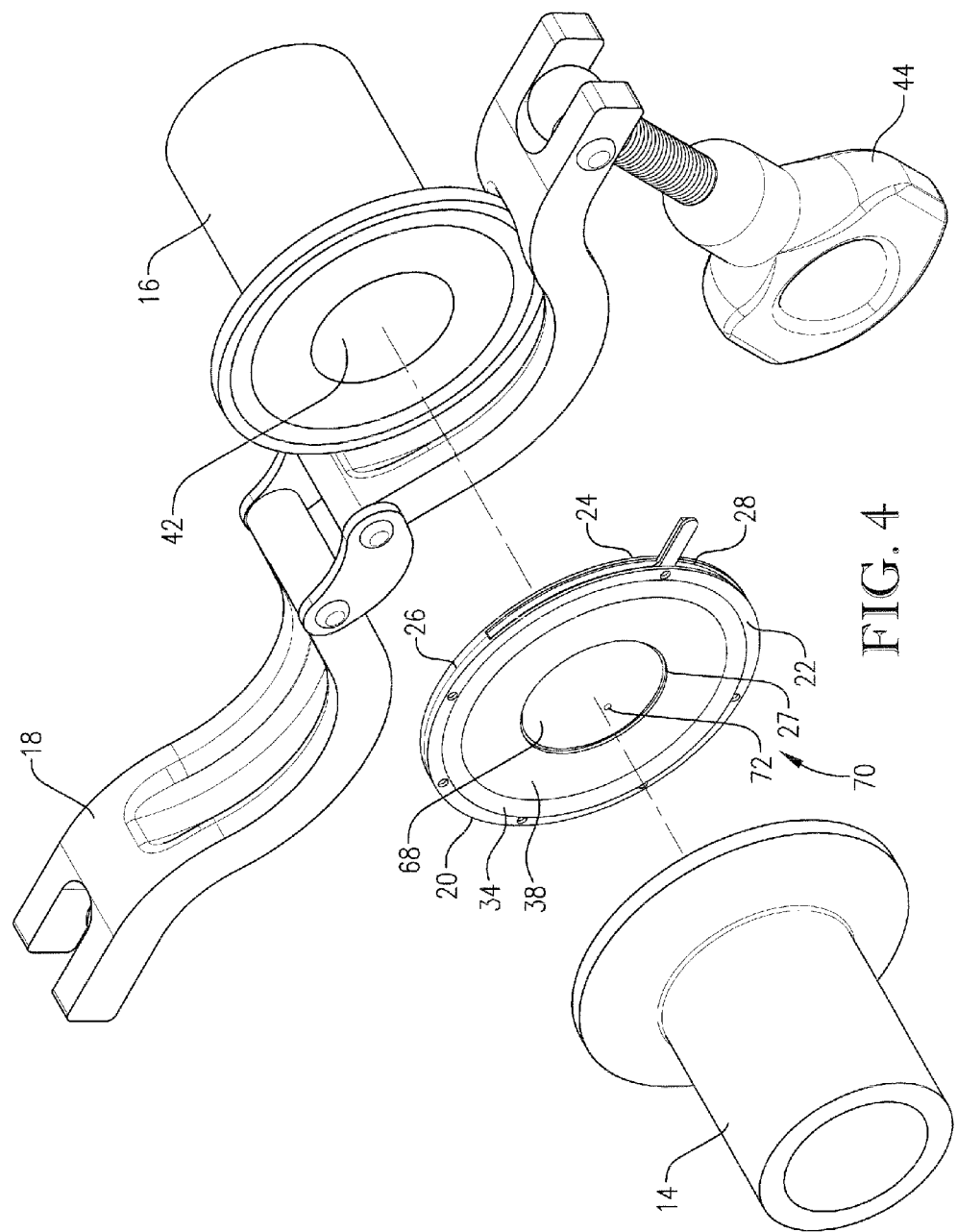
FIG. 4 is a partially-expanded view of the pressure relief assembly shown in FIG. 1 with the clamping mechanism disengaged.
Figure 5:
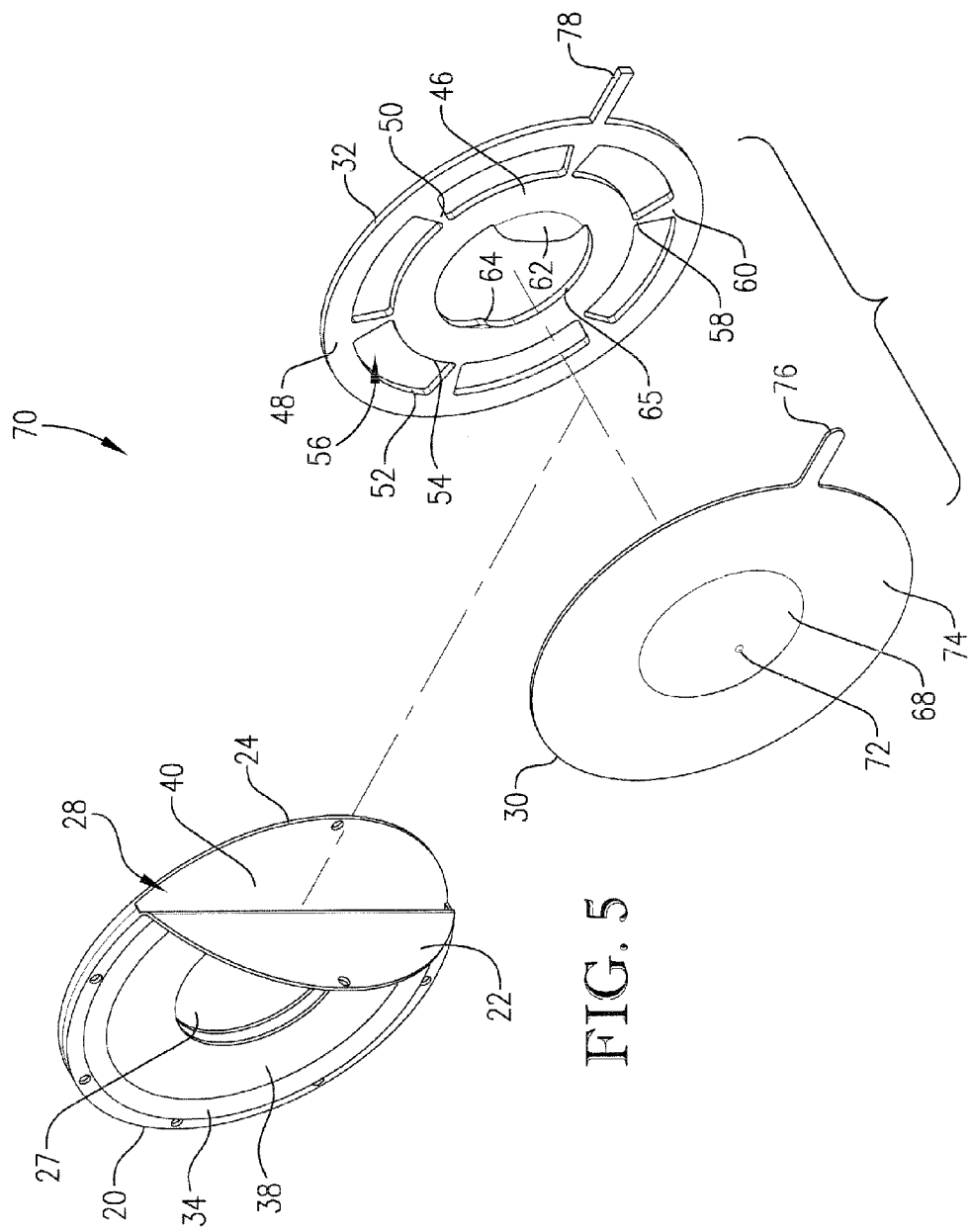
FIG. 5 is an expanded view of a pressure relief device according to one embodiment of the present invention.

As shown in FIGS. 3 and 4, it is customary to employ a gasket 20 which functions as a seal between ferrules 14 and 16. In certain embodiments, gasket 20 is made from a pliable, elastomeric material such as VITON (synthetic rubber and fluropolymer elastomer), EPDM (ethylene propylene diene monomer rubber), and silicone. Also, gasket 20 may be formed from a relatively inelastic thermoplastic material, such as a fluoroethylene polymer, and particularly TEFLON (polytetrafluoroethylene). However, these relatively inelastic gaskets would comprise a two-part construction given that the material cannot be stretched over the disc like the other materials discussed above. Gasket 20 comprises plies 22, 24 connected by a circumferential sidewall 26 and includes a central orifice 27. As depicted in FIG. 5, a slit 28 is formed in a portion of sidewall 26 to permit insertion of a disc 30 and a support member 32 in between plies 22, 24. Each ply 22, 24 of gasket 20 includes a generally circular o-ring bead 34, 36 and an inboard flange section 38, 40, respectively.

A number of problems can arise when attempting to install a pressure relief device employing an elastomeric gasket into a pressure relief device, such as that depicted in FIGS. 1-4. When the gasket material is elastomeric, it tends to deform and squeeze out when force is applied thereto, and elastomers of different stiffness and surface friction characteristics squeeze out differently. Currently there is no simple, practical and reliable means of objectively measuring and controlling the force and compression being exerted upon gasket 20 through the action of clamp 18 when thumb screw 44 is tightened. Operators tend to proceed by feel when determining whether a sufficient amount of torque has been applied to thumb screw 44 so as to properly seat gasket 20. If insufficient torque has been applied, gasket 20 will not have seated properly and may not provide an effective seal. Further, improper clamping of the disc lessens the support for the disc at or near the transition region (i.e., that area between the disc flange and dome) resulting in reduced cycle life and altered disc burst pressure. If thumb screw 44 has been overly tightened, the compression of the gasket results in squeeze out of gasket material into the ferrule annulus 42, to the extent that it encroaches upon the disc dome region. If the gasket comes into contact with the dome surface, the burst pressure of the disc may be significantly lowered.

Also, in the context of sanitary applications, the gasket central orifice is generally configured with tight tolerances so that upon installation, through a controlled, predictable amount of squeeze-out it will very closely align with the ferrule annulus and minimize the formation of gaps or crevices into which material may deposit. Due to the tightness of these tolerances and variation in material properties of the various gaskets, over-tightening of thumb screw 44 can result in too much gasket squeeze-out, leading to the potential change in burst pressure noted above, while under-tightening of thumb screw 44 can result in too little squeeze-out or a faulty gasket seal thus allowing material to deposit between the ferrules and a potential unsanitary condition. Either situation could have an adverse effect on the proper function of the system.

Support member 32 addresses one or more of these issues by lessening the effect of "operator feel" when securing a pressure relief device into a clamp 18. In the embodiment shown in FIG. 5, support member 32 comprises an annular inner hub 46, an outer peripheral portion 48 radially spaced from inner hub 46, and one or more connector segments 50 extending between inner hub 46 and outer peripheral portion 48. Connector segments 50, in cooperation with outer peripheral portion inner margin 52 and inner hub outer margin 54, define one or more apertures 56 in support member 32. It is noted that apertures 56 are in essence relief areas, the function of which are described below. It is within the scope of the present invention for the relief areas to present configurations other than apertures that pass entirely through the support member. In one embodiment, the relief areas may comprise recessed pockets between inner hub 46 and outer peripheral portion 48. Inner hub 46 and outer peripheral portion 48 are generally concentric, continuous rings held together by connector segments 50.

In one embodiment of the present invention, connector segments 50 are substantially triangular in shape and comprise a narrow apex portion 58 and an opposing base portion 60. However, it is within the scope of the present invention for connector segments to be shaped differently, including being rectangular, curved (sinuous), linear but angled, curved (concave), or even curved (convex). The apex portion 58 of each connector segment 50 is connected to inner hub 46, and the base portion 60 of each connector segment 50 is connected to outer peripheral portion 48. In certain embodiments, the one or more apertures 56 are defined by four side margins, two of which are arcuate and two of which are substantially linear. In further embodiments, apertures 56 are substantially uniformly distributed on support member 32 outboard of inner hub 46.

Support member 32, and particularly inner hub 46, optionally comprises an inwardly extending tongue 62 and tooth 64. Tongue 62 extends into the support member central annulus 65 and is configured to support a hinge section 66 of rupture disc 30 (FIG. 7) during reversal and opening of bulged portion 68 in order to prevent disc fragmentation. As shown in FIG. 6, tongue 62 is itself formed up from the general plane of support member 32 so as to nest within the concave area of bulged portion 68 when disc 30 and support member 32 are mated together (e.g., though one or more spot welds). Likewise, tooth 64 is generally out-turned toward the concave area of bulged portion 68. However, it is within the scope of the present invention for tongue 62 and/or tooth 64 to be substantially co-planar with inner hub 46, outer portion 48, and connector segments 50, or to be formed up to extend away from the bulged portion 68 of the disc. It is also anticipated that in other embodiments there may be a plurality of tooth and tongue members. Upon reversal of bulged portion 68, tooth 64 engages the disc and assists with disc opening.

In certain embodiments, disc 30 comprises a reverse-acting rupture disc having a concavo-convex (i.e., bulged or domed) central rupturable portion 68. However, it is within the scope of the present invention to employ forward-acting bulged discs and un-bulged or flat rupture discs. Rupture disc 30 is generally constructed according to the teachings of U.S. Pat. No. 6,945,420, incorporated by reference herein in its entirety, and comprises a bulged portion 68 having an area of altered metallic grain structure 72. Bulged portion 68 is surrounded by a generally planar flange section 74. A tag extension 76 is optionally included to assist with disc installation. Tag extension 76 is sized to correspond with a similar tag extension 78 on support member 32. Disc 30 is also optionally provided with a recessed line of opening 80. As shown, line of opening 80 is formed in the concave surface of disc 30 and is generally C-shaped in configuration. As previously noted, disc 30 includes a hinge portion 66 located between the spaced-apart ends of the line of opening.

As shown in FIGS. 5 and 7, rupture disc 30 and support member 32 are mated and then placed inside gasket 20 to form a pressure relief assembly 70. Pressure relief assembly 70 is then installed between ferrules 14, 16 and secured with clamp 18. Thus, ferrules 14, 16 and clamp 18 cooperatively define a holder for pressure relief assembly 70. The tightening of thumb screw 44 compresses gasket 20 thereby displacing a portion of the gasket material. However, instead of squeezing out into bore 42 to the extent where it could encroach upon bulged portion 68 and alter the burst characteristics of disc 30, at least a portion of the gasket material is displaced into apertures 56 (i.e., the relief areas). The triangular shape of connector segments 50, particularly the placement of apex portion 58 proximate inner hub 46, assists in direction of displaced gasket material into apertures 56.

As shown in FIGS. 8, 8a, 8b, and 9, the compression of the pressure relief assembly 70 by the action of ferrules 14, 16 and clamp 18 also results in deformation of the rupture disc flange section 74 into apertures 56. Thus, flange section 74 becomes embossed with a pattern of segments 80 that generally dimensionally correspond with apertures 56. Particularly, embossed segments 80 are separated from each other by one or more triangular sections 82, with each of triangular sections 82 comprising an apex portion 84 and an opposing base portion 86, and apex portion being located inboard of base portion 86. Embossed segments 80 further include raised surfaces 88 that are received within apertures 56.

In alternate embodiments according to the present invention, embossed segments 80 can be pre-formed in flange section 74 prior to installation. However, embossed segments 80 still generally dimensionally correspond with apertures 56 so as to be received therein during mating of disc 30 and support member 32. Embossed segments 80 in the disc also increase the stiffness of the disc thereby enhancing its general ability to resist damage due to handling and processing.

Figure 10:
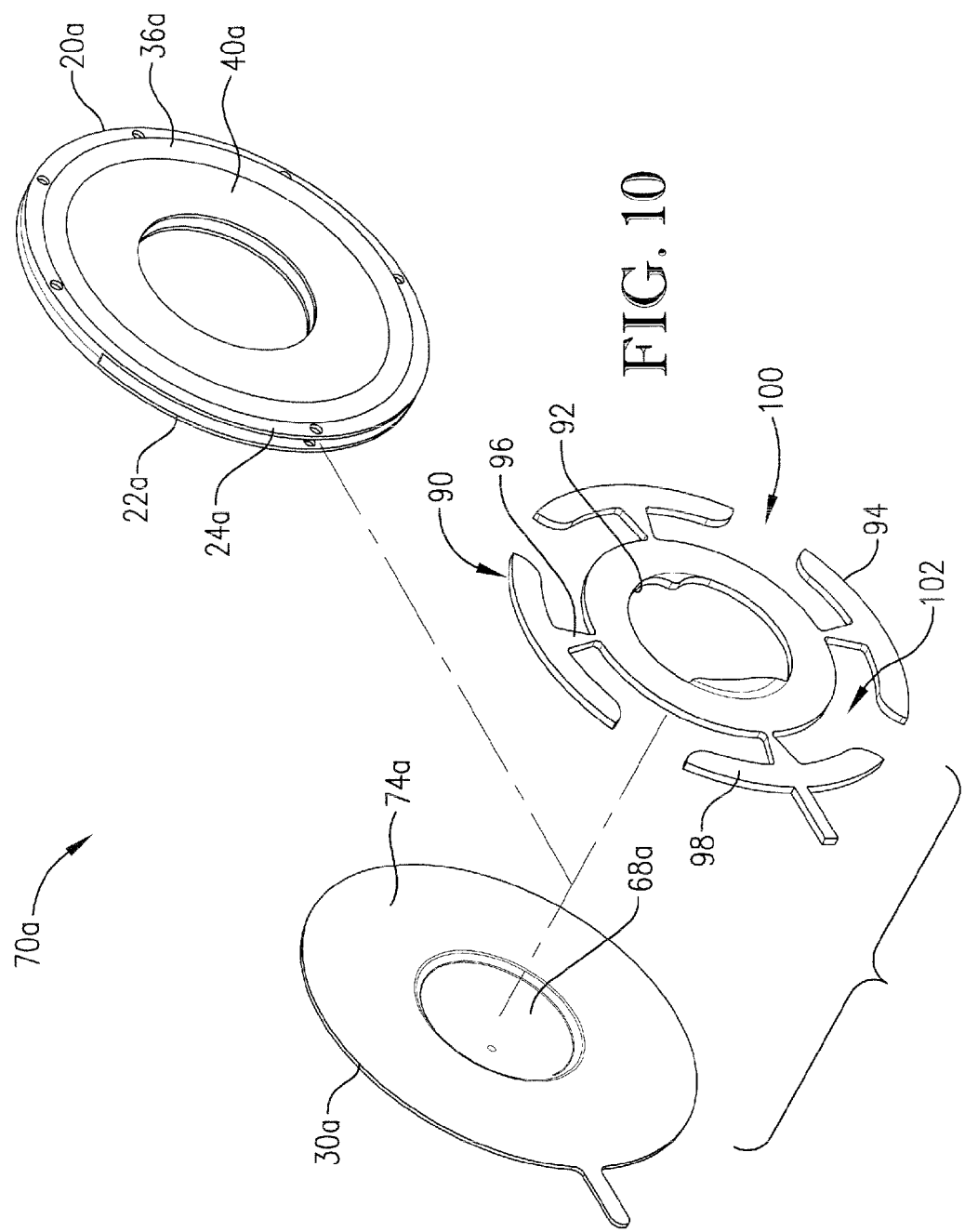
FIG. 10 is an expanded view of yet another embodiment of a pressure relief device according to the present invention.
Figure 11:
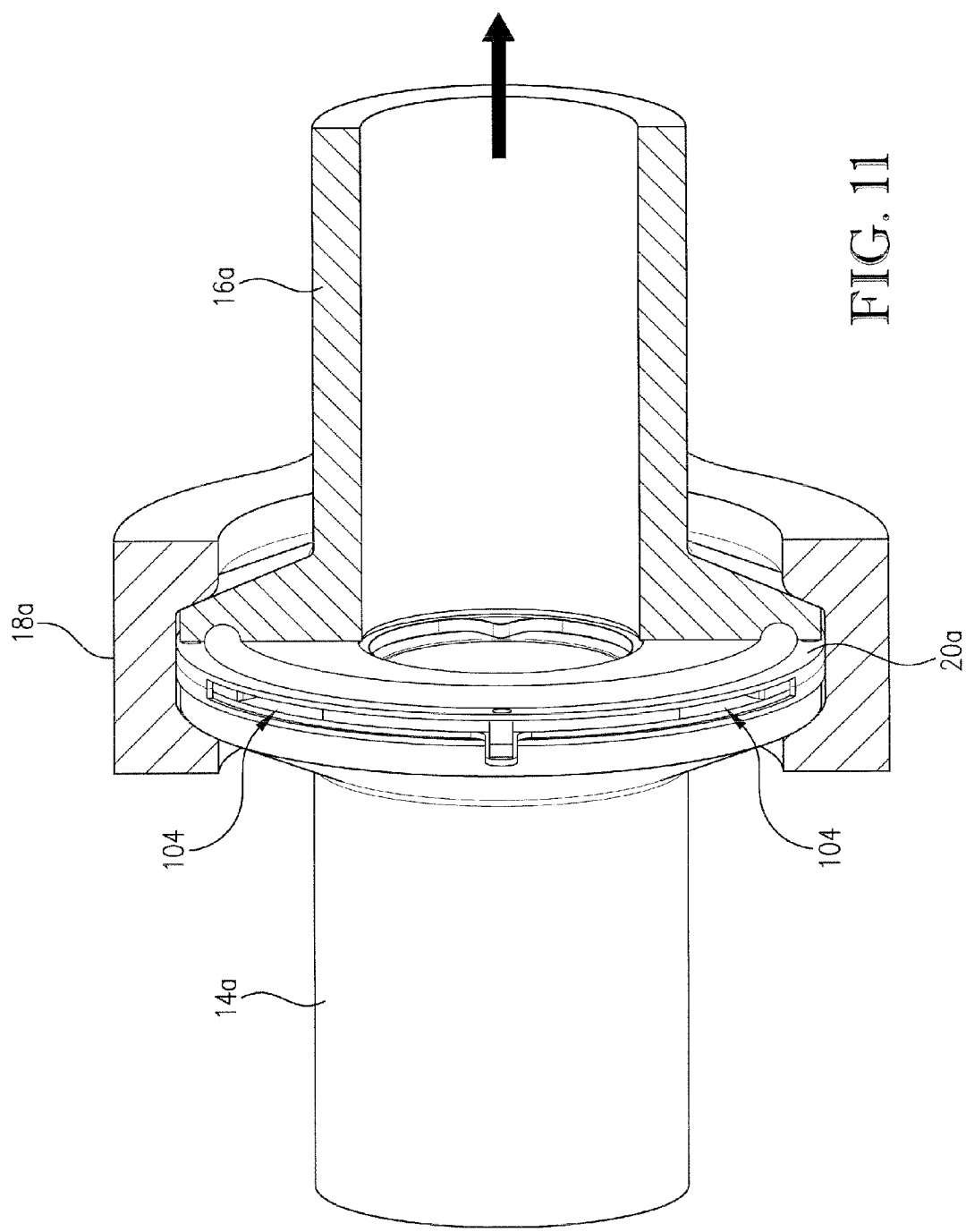
FIG. 11 is a partially-sectioned view of a pressure relief assembly employing the pressure relief device of FIG. 10.

Turning now to FIGS. 10 and 11, another embodiment of a support member 90 is shown. Like the embodiment described above, support member 90 also comprises an annular inner hub 92, an outer peripheral portion 94 radially spaced from inner hub 92, and one or more connector segments 96 extending between inner hub 92 and outer peripheral portion 94. However, unlike support member 32, outer peripheral portion 94 comprises one or more discontinuous, arcuate segments 98 having one or more gaps 100 located therebetween which communicate with apertures 102. In the embodiment illustrated, one connector segment extends between each arcuate segment 98 and inner hub 92, however, alternate configurations are possible.

Disc 30a and gasket 20a are similar in configuration to their counterparts described above with reference to FIGS. 5-7. Note, too, that it is considered within the scope of the present invention for this embodiment to utilize a rupture disc having preformed embossed segments that correspond with gaps 100 and apertures 102 similar to the embodiment shown in FIGS. 8-9.

As described above, installation of pressure relief assembly 70 between ferrules 14, 16 involves a subjective sense of feel on the part of the operator to know when thumb screw 44 has been torqued down to a sufficient degree to effect a good seal between the ferrules and gasket. Thus, even when employing support member 32 discussed herein, it remains a possibility that the operator will not sufficiently tighten clamp 18 to effect a tight seal between the ferrules and those portions of gasket 20 overlying inner hub 46. If this inner-most seal is not sufficiently made, process fluid may leak past inner hub 46 and enter void spaces that may be created by the displacement of gasket material into embossed segments 80. However, this escape of process fluid may go unnoticed if it is stopped by the seal formed between the ferrules and gasket bead 34. If this leakage of process fluid were to occur, the burst pressure of disc 30 could be altered due to stresses created on the disc flange region 74.

The present embodiment illustrates a pressure relief assembly 70a that addresses this latter concern. Should the inner-most seal not be properly made, the build up of pressure due to process fluid leaked outboard of inner hub 92 would be relieved as the outer margin of the seal ("disc") flange conforms to these gaps 100, creating a leak path. As shown more clearly in FIG. 11, gaps 100 lead to the creation of passages 104 when pressure relief assembly 70a is installed between ferrules 14a, 16a and secured by clamp 18a. If the clamp 18 is not tightened properly, process fluid could escape from passages 104 and alert the operator to adjust clamp 18 accordingly.

The embodiments of the invention described above are provided by way of illustration and nothing therein should be taken as a limitation upon the overall scope of the invention.

We claim:

1. A rupture disc comprising a central rupturable portion and a circumscribing flange section, said flange section including one or more embossed segments.

2. The rupture disc according to claim 1, wherein said one or more embossed segments are substantially uniformly distributed on said flange section.

3. The rupture disc according to claim 1, wherein said central rupturable portion comprises a concavo-convex bulged section.

4. The rupture disc according to claim 3, wherein said rupture disc is a reverse-acting rupture disc.

5. The rupture disc according to claim 4, wherein said dome section includes a recessed line of opening formed in the concave portion of said bulged section.

6. The rupture disc according to claim 4, wherein said bulged section comprises an area of altered metallic grain structure.

7. The rupture disc according to claim 1, wherein said one or more embossed segments are separated from each other by one or more triangular sections, each of said triangular sections comprising an apex portion and an opposing base portion, said apex portion being located inboard of said base portion.

8. A pressure relief device comprising the rupture disc according to claim 1 and a rupture disc support member.

9. The pressure relief device according to claim 8, wherein said rupture disc support member includes an annular inner hub, an outer peripheral portion radially spaced from said inner hub, and one or more connector segments extending between said inner hub and said outer peripheral portion, said connector segments defining one or more relief areas located between said inner hub and said outer peripheral portion.

10. The pressure relief device according to claim 9, wherein said support member inner hub comprises a tongue segment that extends inwardly into the hub annulus and is configured to support a hinge section of said rupture disc during opening thereof.

11. The pressure relief device according to claim 9, wherein said one or more connector segments are substantially triangular in shape, each of said one or more connector segments having a narrow apex portion and an opposing base portion, the apex portion of each connector segment being connected to said inner hub, and the base portion of each connector segment being connected to said outer peripheral portion.

12. The pressure relief device according to claim 9, wherein said one or more relief areas are substantially uniformly distributed on said support member outboard of said inner hub.

13. The pressure relief device according to claim 9, wherein said outer peripheral portion forms a continuous ring.

14. The pressure relief device according to claim 9, wherein said outer peripheral portion comprises one or more discontinuous, arcuate segments.

15. The pressure relief device according to claim 8, wherein said pressure relief device further comprises a two-ply annular gasket, said rupture disc and said support member being received between said gasket plies.

16. The pressure relief device according to claim 8, wherein said one or more embossed segments are substantially uniformly distributed on said flange section.

17. The pressure relief device according to claim 8, wherein said central rupturable portion comprises a concavo-convex bulged section.

18. The pressure relief device according to claim 17, wherein said rupture disc is a reverse-acting rupture disc.

* * * * *